March 31, 1970  N. B. PROCTOR ET AL  3,504,276
PRINTED CIRCUIT COILS FOR USE IN MAGNETIC FLUX LEAKAGE
FLOW DETECTION
Filed April 19, 1967  4 Sheets-Sheet 1

Alfred E. Crouch
Ruby C. Beaver
Noel B. Proctor
Richard S. Demecs
INVENTORS

BY
Arnold, Roylance, Kruger & Durkee
ATTORNEYS

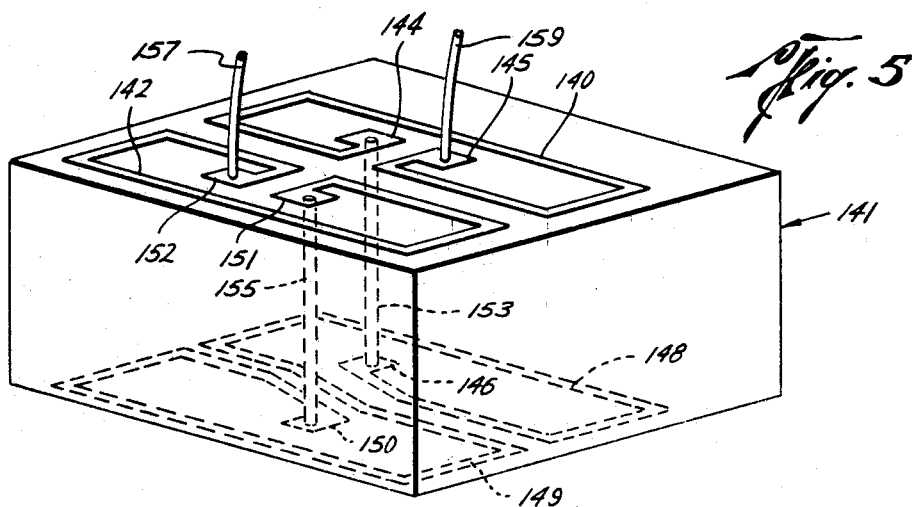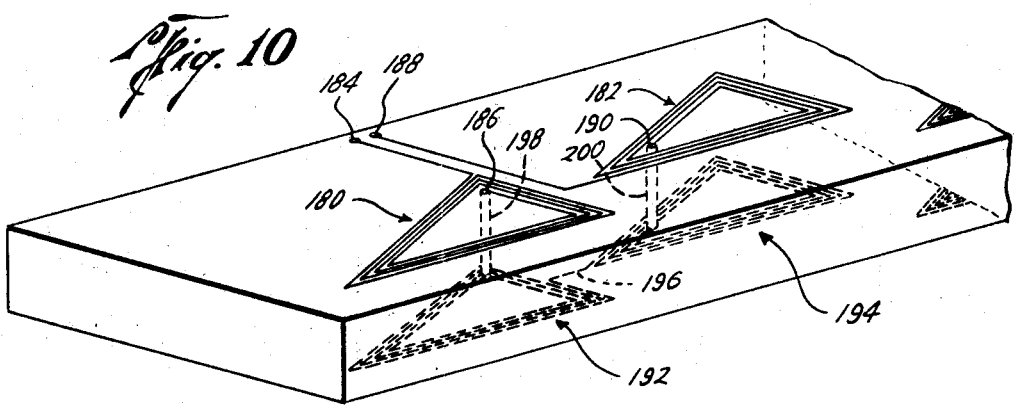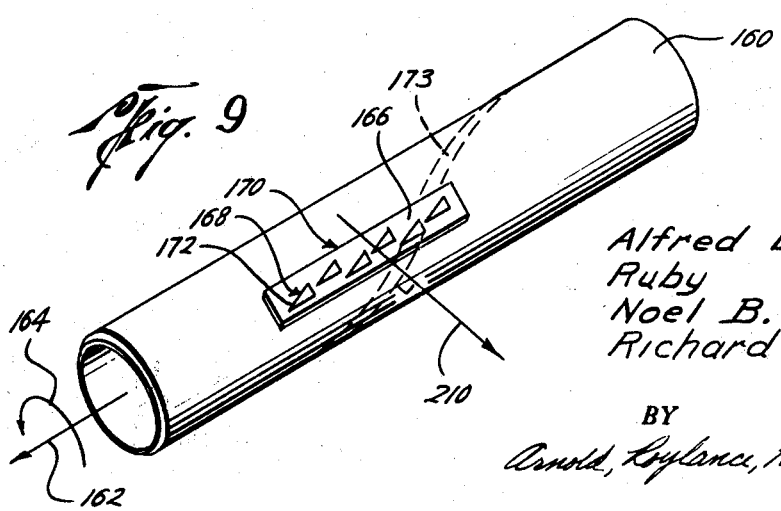

March 31, 1970   N. B. PROCTOR ET AL   3,504,276
PRINTED CIRCUIT COILS FOR USE IN MAGNETIC FLUX LEAKAGE
FLOW DETECTION
Filed April 19, 1967   4 Sheets-Sheet 3
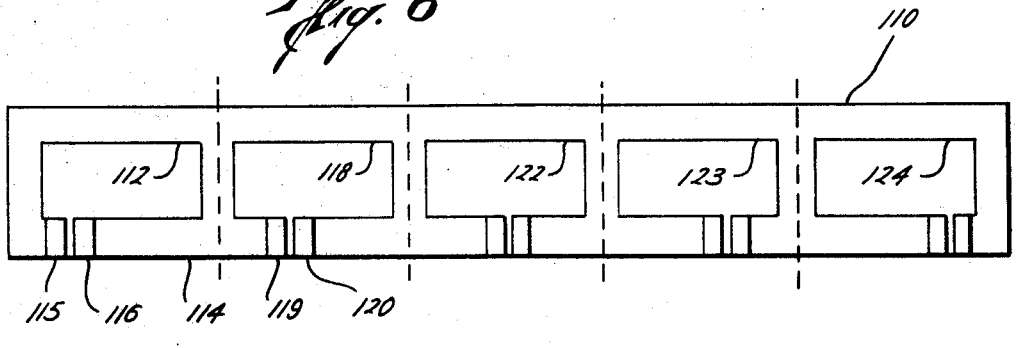
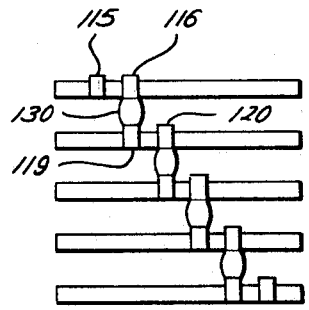
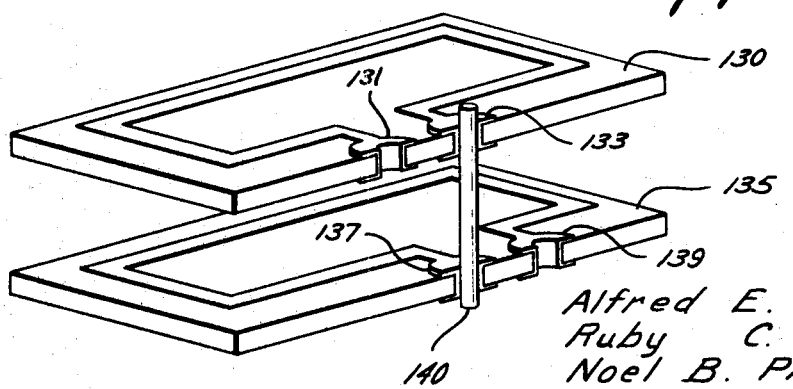
Alfred E. Crouch
Ruby C. Beaver
Noel B. Proctor
Richard S. Demecs
INVENTORS
BY
*Arnold, Roylance, Kruger & Durkee*
ATTORNEYS

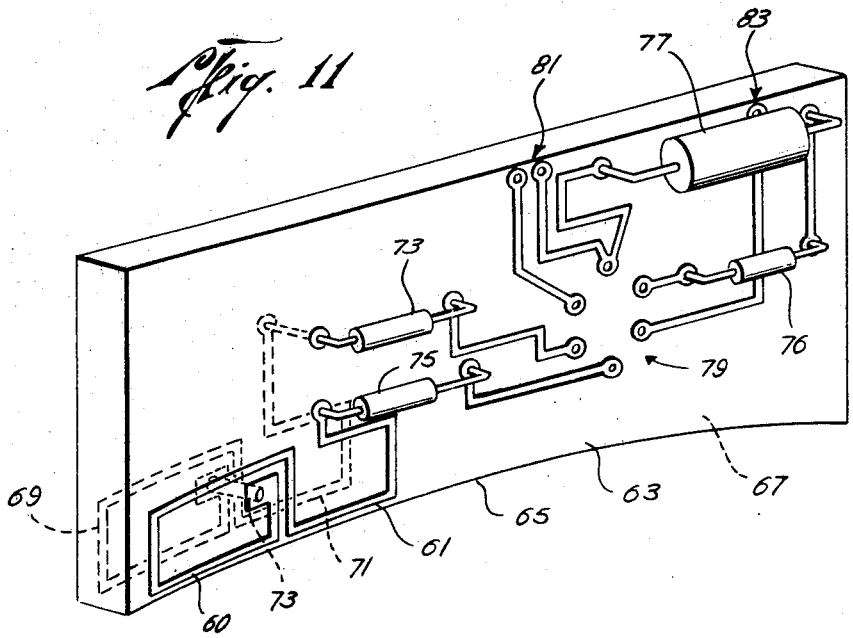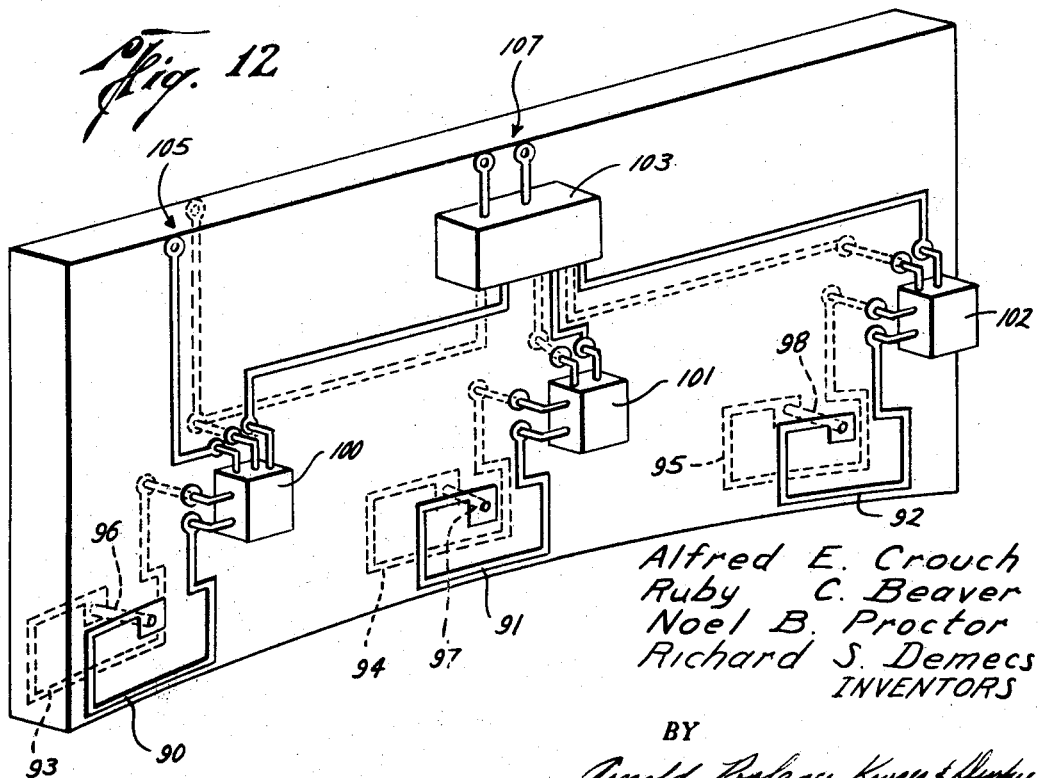

__United States Patent Office__

3,504,276
Patented Mar. 31, 1970

3,504,276
PRINTED CIRCUIT COILS FOR USE IN MAGNETIC
FLUX LEAKAGE FLOW DETECTION
Noel B. Proctor, Alfred E. Crouch, Ruby C. Beaver, and
Richard S. Demecs, Houston, Tex., assignors to American Machine & Foundry Company, New York, N.Y., a corporation of New Jersey
Filed Apr. 19, 1967, Ser. No. 632,003
Int. Cl. G01r 33/12
U.S. Cl. 324—37          5 Claims

ABSTRACT OF THE DISCLOSURE

The present invention pertains to methods of making improved search coil suitable for detecting variations in flux and to the resulting improved apparatus thereby produced. Basically, coils of simple and complex coil-loop configurations are made by printed circuit techniques that in the various embodiments described have one or more of the following characteristics: encompass precise areas, have precise side and angle dimensions, are precisely disposed and connected with respect to each other and are precisely maintained with respect to the edges of the board or boards to which they are attached for uniform detection. The specific coil structures that are described include matched coil pairs (both wired series-aiding and series-opposed), stacked multi-turn coils on a series of separate boards, coil or coils mounted together with exemplary functionally related components, and coils of angularly disposed sides for maximum sensitivity for detecting flux disturbances that may occur in two predominantly predetermined directions. One method of making a stacked coil configuration includes forming substantially identical coils on separate boards and having progressively offset ends brought out to respective edges and recessed for making convenient connections.

BACKGROUND OF THE INVENTION

Field of the invention

This invention relates to coil construction suitable for use in testing and grading both ferromagnetic and non-ferromagnetic members for defects in combination with an electromagnetic testing system. More particularly, the invention relates to inspection coils made by a printed circuit technique that may be used in a plurality of different system applications.

DESCRIPTION OF THE PRIOR ART

Coils used in apparatus as a means for detecting magnetic flux disturbances created by flaws in ferromagnetic members, such as well pipe, are commonly used in the industry and are exemplified in the coils shown in Lloyd 2,650,344. Electromagnetic fields of either DC or AC variety establishing lines of flux in an inspected member may be established in a variety of ways. For instance, in a pipe capable of being magnetized, a magnetic field may be established by electromagnetizing the member so that the lines of flux are aligned either longitudinally along the length of the member or circumferentially. Inspection then may be made while the member is subjected to the established field (or, alternately, while the member retains residual magnetism) by moving the member with respect to the coil or coils, disturbances in the flux at any particular surface location resulting in a change of current flowing from the coil or coils. An example of a system that may be used for magnetizing a member is shown in Lloyd, which uses coils wrapped circumferentially about the member. Other examples are shown in Price et al. 2,878,446 and Wood 2,881,387.

For member material of a substance other than magnetic, flux patterns may be established by using an alternating current electric field, which creates eddy currents within the material. Each of these established eddy currents has established a corresponding magnetic field and inherently established flux lines. Of course, eddy currents may also be established in a ferromagnetic member with an alternating current source.

Flux lines in material of homogeneous structure represent even and uninterrupted, non-varying patterns. However, irregularities in the material of the measured member cause disruptions in the otherwise smooth pattern of flux lines. Proper analysis of the disruptions will reveal to those experienced in the art the nature of the irregularities. Also, limited automatic use of the disruptions' responses may be made.

Economically producing coils suitable for operating in detection systems such as described above have heretofore been a problem in the industry. Maintaining precision of the area inside the coils is very critical and necessary to achieve a matched response when coils are connected in series opposition, which is highly desirable to balance various responses that may occur. For instance, it is highly desirable to so connect these coils to balance out uniform extraneous conditions, such as from electromagnetic irradiations from fluorescent lighting fixtures, from changes in electromagnetic or magnetic fields caused by uniform changes in pipe thickness, etc. It is apparent that a general uniform pattern will be detected equally by each of a pair of opposed coils so that there will be no natural response received by the recording and responding medium. A flaw, on the other hand, will cause the flux pattern to be different from area to area, thereby affecting one coil differently from its matched counterpart. In order to keep the area inside the matched coils within very close tolerance, after coils are wound under controlled and often costly conditions, it has been necessary to embed the produced coils within non-conductive "shoes."

A further problem attendant in prior art coil forms stems from the difficulty in spacing coils a uniform distance from the surface of a measured article, such as a pipe. Sensitivity varies greatly as the coils are positioned away from the surface; therefore, it is highly desirable to space the coils as closely to the pipe surface as possible without the coils touching the pipe or each other. And, because of the necessity for exactly matching the response of both coils in a series opposed pair, the distance must be the same for each coil within very close tolerance.

A still further factor is the high production cost of coils suitable for flux inspection in that heretofore they have been wound using very small wire, on the order of AWG 44. The expense of handling these coils, even with the semi-automatic machines available has been significant.

SUMMARY OF THE INVENTION

The present invention not only provides an improved manner of making coils having equivalent characteristics, but also provides coil structures having superior characteristics to those coils used for the same purpose but otherwise constructed.

For purpose of the present invention, the term "printed circuit" and "printed conductor" shall include the common meaning for those terms in the art, and including any means of affixing the full length of a conductive material on a non-conductive surface, as distinguished from assembling components onto a surface using spaghetti wire. The terms shall include all circuits produced by methods including printing with metallic ink on a suitable sheet of nonconductive backing material, etching a laminated surface, spraying through a mask, electro deposition, or other comparable methods as described, for instance, in "Printed Circuit In Space Technology: Design and Application," Albert E. Linden, 1962, Prentiss-Hall, Inc.

Generally, described are a plurality of embodiments of suitable coil shapes and structures for use in detecting flux emanating from the surface of an inspected article comprising printed conductors affixed in precision and sometimes matched coil-loop configurations to one or more non-conductive boards, the coils in some embodiments being appropriately positioned with respect to the edges of the boards with which they are connected so as to be uniformly disposed within the emanating flux. Dependent upon the use with which the coils are to be used, the coils may be positioned to be parallel with the surface of the article in which flux is established, perpendicular to the surface, or at an angle to such surface. If it is desirable to have a plurality of coils in a single detecting apparatus, these coils may be placed on the same side of one board, on opposite sides of the same board, or on a plurality of boards with junctions therebetween, some junctions being made through the boards (e.g., via through-hole plating techniques) and other junctions being made at the edges of the boards. Also, a particularly convenient use of printed circuit coils is with certain other components, such as amplifiers and/or logic circuits in solid state form that are mounted on the boards on which the coil-loop configurations are formed and secured.

Although the advantages of using coils which are printed or otherwise affixed on non-conductive boards are numerous, some of the important advantages are here recited to show the importance of the development. For example, areas can be uniformly controlled with precision from one coil to the next, thus making it possible to match differential search coils by having precisely the same area in both coils of a pick-up pair, resulting in an extremely low noise detection means.

Another advantage results from the printed circuit coils being absolutely rigidly uniplanar, which gives controlled lift-off across the entire length of the coil, thereby causing uniform flaw sensitivity from end to end of each coil.

Further, in production quantities printed circuit coils may be produced cheaper than hand-wound coils, machine-wound coils or coils wound in a semi-automatic process.

Printed circuit coils may be stacked, and connections made therebetween from board to board, thereby maximizing the strength and rigidity that is available.

Printed circuit coils also permit the making of complex shapes of coils of uniform design substantially as easily as coils of ordinary structure. This means that coil sides of absolutely straight dimension and precise corners are possible.

It is also much easier to connect external leads to a printed circuit coil than any other kind of coil, resulting in a stronger and faster connection. This is particularly important considering that search coils of conventional design are typically wound of AWG 44 size wires and that external lead wires are typically AWG 24 Teflon insulated flexwire.

Search coils on a printed circuit board also provide a visibly obvious polarity, thereby minimizing the possibility of incorrectly connecting the coils into an assembly. Also precision alignment of ends of matched coils located on opposite sides of a board from each other and from board to board makes correct connection automatic, again minimizing the possibility of wrongly connecting the coils into an operating circuit.

Coils of a predetermined spacing are particularly sensitive to a specific range of flaw widths. Hence, under controlled traverse speed conditions, when a flaw is traversed within this range, a large signal at a specific known frequency occurs. Therefore, printed circuit coils make it possible to improve the resolution of flaw types in conjunction with frequency filtering circuits.

When the base material of the conductor forming printed circuit coils is properly chosen, search coils may be made which operate at much higher temperature than the multi-turn wire search coils of the prior art. High temperature materials that are available are copper or nickel conductors placed on a ceramic base, non-conductive board.

Printed circuit coils on a board sufficiently large may be combined with other components, thereby minimizing the number of parts to build a particular circuit. In such a combination, high voltage can be isolated effectively from the coils themselves, and a minimum of noise results in the pick-up leads and wires since their distances are the shortest possible to their respective amplifiers and logic circuits. Also, ambient electrical, magnetic or electromagnetic fields may be more effectively avoided.

Moreover, in these combinations and in applications where coils are mounted on boards separate from the other components, when coils are placed on both sides of the board and it is desired to connect them, through-hole plating may be used to minimize the number of solder connections required.

Furthermore, when search coils are placed on both sides of a single board, the maximum amount of coils are placed in a confined space, thereby maximizing the signal voltage which is developed from a single flaw.

A thin, highly permeable magnetic core of precise and reproducible dimension may be used in some applications with a printed circuit search coil assembly, thereby making it convenient to change the dimension of the assembly, and hence the resolution.

If search coils are brought out to the side or edge of the board to which they are attached, they may be easily assembled and connected, a very difficult job with the normal multiturn search coil wound with small wire.

Identification may be made easier from coil type to coil type, since it is possible to place a part number on the printed circuit board at the time of manufacture, thereby providing for all time a certainty of identification.

In an alternating current, eddy current detection scheme, printed coils, which by their very nature are extremely thin, provide a lower AC resistance than other types of coils. This thinness of the conductor tends to minimize the eddy currents circulating transversely in the conductor itself.

Yet another and no small advantage, is that a printed circuit coil is much more rugged than the wire coils and much less likely to fail under vibration or in a stress field resulting from shrinkage of the plastic encapsulating the coil.

BRIEF DESCRIPTION OF THE DRAWINGS

So that the manner in which the above recited advantages of the invention, as well as others which will become apparent, are attained can be understood in detail, more particular description of the invention briefly summarized above may be had by reference to the embodiments thereof which are illustrated in the appended drawings, which drawings form a part of the specification. It is to be noted, however, that the appended drawings illustrate only typical embodiments of the invention and therefore are not to be considered limiting of its scope, for the invention may admit to other equally effective embodiments.

In the drawings:

FIG. 5 is an isometric view of a complex, double printed circuit coil structure that may be readily made.

FIG. 6 is the top view of a printed circuit board showing a plurality of single coils as they might be formed in one method of making a multi-turn search coil configuration.

FIG. 7 is an end view of a multi-turn search coil configuration that is made from the coil structure shown in FIG. 6.

FIG. 8 is a method of attaching two turns of a multi-turn structure shown in FIG. 7.

FIG. 9 is a non-conductive board having affixed thereto a plurality of coils shown in FIG. 10 and oriented with respect to an inspected member.

FIG. 10 is an isometric view of a partial printed circuit arrangement, wherein the coils have sides aligned primarily in two directions.

FIG. 11 is a printed circuit board comprising a printed circuit coil structure in combination with other typical components.

FIG. 12 is a printed circuit board comprising a plurality of printed circuit coils in combination with other components.

DESCRIPTION OF THE PREFERRED EMBODIMENTS

Figure 1:
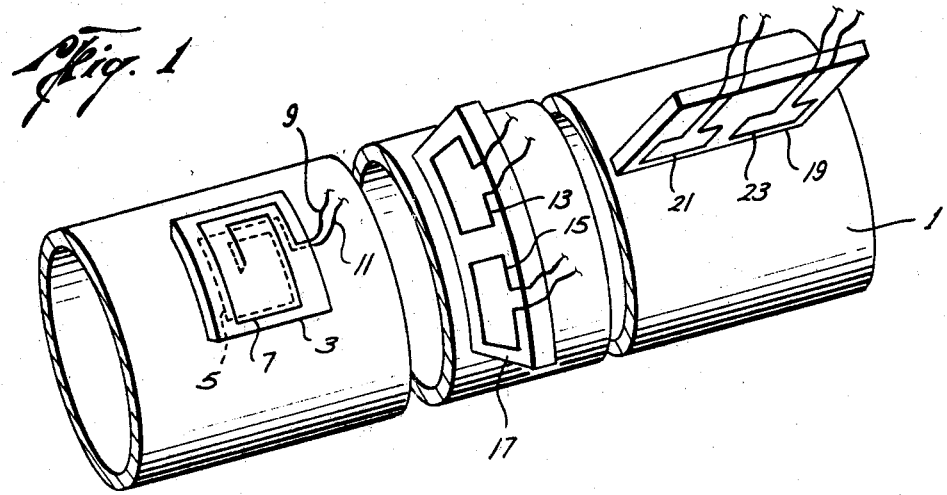
FIG. 1 is an oblique view of a tubular member which has aligned there opposite printed search coils affixed to non-conductive boards of various configurations, to illustrate use of coils in a plurality of applications.

Now turning to the drawings and, first, to FIG. 1, tubular member 1, which may for convenience be assumed to be ferromagnetic, is shown under three conditions of search. In each condition it is first assumed that member 1 has been appropriately subjected to magnetism so as to establish a flux field in the pipe in the appropriate direction to complement the search being performed.

On the left hand side of the illustration is shown a non-conductive board 3 shaped curvilinearly to complement the outside perimeter of member 1, and having a printed conductor circuit coil 5 on the surface closest to the member and a printed circuit 7 on the surface of the board away from the member. The coils are connected to each other to form a search coil pair through the board. Although not shown, the board, in turn, may be mounted appropriately in a search shoe of conventional design, thereby lifting the coil 5 slightly, but uniformly, away from the surface of member 1. As board 3 is moved with respect to member 1 by a means also not shown, the variation or disturbances in the established flux caused by flows in the member are detected by the coils, thereby causing a variation in the generated current taken from output leads 9 and 11 connected to the coil pair.

The middle section of member 1 is shown being inspected by a printed circuit pair 13 and 15 connected to a non-conductive board 17, coil 13 and coil 15 inspecting different circumferential areas of member 1. In this instance, board 17 is aligned perpendicular to the surface of member 1 such that coil 13 is in the same transverse plane as coil 15, board 17 having an edge appropriately following the curvilinear contour of member 1. Again, as with board 3, when member 1 is moved with respect to board 17, flux variations detected by coils 13 and 17 result in variations in the produced currents in the leads taken therefrom.

Finally, a board 19 having coils 21 and 23 appropriately affixed thereto is shown disposed adjacent member 1 and longitudinallly with the axis thereof. In this case, the contour of the board edge is straight, since it is aligned parallel with the axis, rather than curved as with board 17 which follows the circumferential contour of member 1. Again, the detection of flux variations by coils 21 and 23 is as before, but in this case the coils are particularly sensitive to longitudinally aligned flaws.

In each of the coil placements shown, the coil sides subjected to flux emanating from the surface of the pipe (in the board 17 and board 19 embodiments, the coil sides that are placed nearest the pipe surface) are placed in the strongest possible flux field, which field is uniform if the material is homogeneous, the dimensions of the pipe are uniform, and there is uniform magnetism established in pipe 1.

Figure 2:
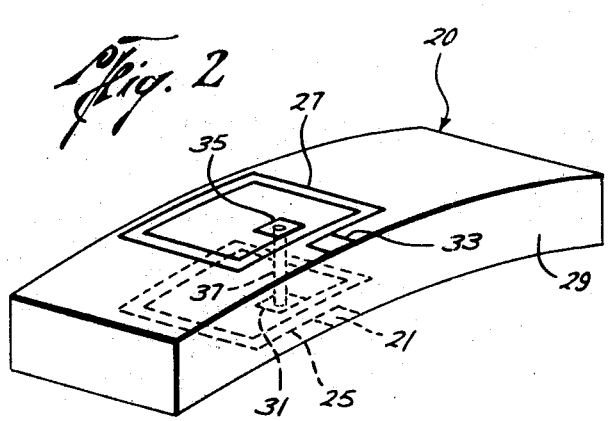
FIG. 2 illustrates a non-conductive board having printed circuit coils on opposite sides thereof, oriented and connected to the board in series-aiding configuration.

Now turning to FIG. 2, a non-conductive printed-circuit type board 20 having a wide surface contour which is curvilinear, such as with board 3 described above, has a multi-turn coil 25 affixed in conventional manner to one surface of the board and a similar multi-turn coil 27 affixed to the other surface of the board and diametrically oppositely disposed. Tracing the coil 25 on the underneath surface of board 20 to be placed adjacent the surface of the inspected member from its outer end 21, which extends to one edge 29 of board 20, it will be observed that the coil traces in a clockwise direction, finally terminating with end 31 at the centermost portion of the coil. Similarly, tracing the outer end 33 of coil 27, the end which terminates in edge 29 of the board, it will be seen that tracing the coil through to innermost end 35, the coil traces in a counterclockwise direction. Innermost coil ends 31 and 35 are connected through board 20 by a connector 37, thereby establishing a coil pair connected in series-aiding, since there is no reverse direction in tracing both coils through the connecton.

Figure 3:
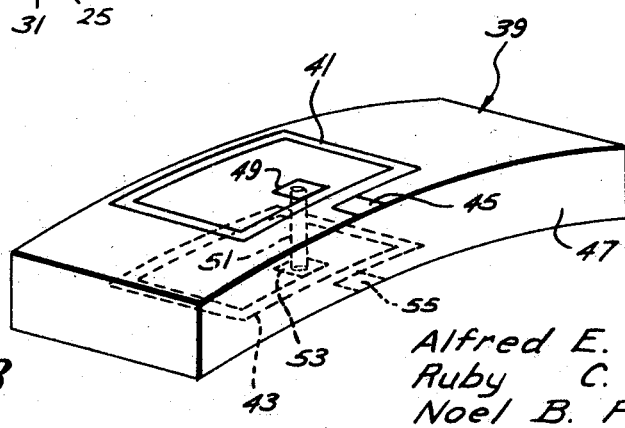
FIG. 3 illustrates a non-conductive board having printed circuit coils on opposite sides thereof, oriented and connected to the board in series-opposing configuration.

FIG. 3 illustrates a non-conductive board 39, similar to board 20, having diametrically opposite coils 41 and 43 affixed to the opposite sides thereof. In this instance, however, coils 41 and 43 are wound to be series-opposed rather than series-aiding. This may be seen by tracing coil 41 starting at the end 45 that is in communication with edge 47 and following it counterclockwise to its inside end 49 through coil connection 51 to the other side of the board to end 53 of coil 43 and clockwise around coil 43 to outer end 55 terminating in edge 47. Since there is a reversing in the tracing direction, when the coils are considered from the same side of the board, the coils are connected in series opposition.

In summary, it will be seen that to affix coils in series-aiding, the coils are oppositely coiled on their respective board sides and to make them series-opposing the coils are coiled in the same direction.

Figure 4:
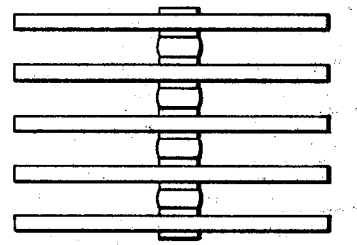
FIG. 4 is a cross-sectional view of a plurality of non-conductive boards having printed circuit coils thereon, joined together in multiple-turn configuration.

FIG. 4 illustrates a plurality of boards similar to board 29 or board 39 in a multi-turn structure. To join the coils mounted on these boards together, the ends thereof that communicate with the common edges of the respective boards may be soldered or otherwise attached by appropriate leads that are soldered. If the boards are then, in turn, rigidly mounted within a convenient holding means (the soldered connections may by themselves constitute such a means) so that the coil disposition does not change from board to board, the entire coil structure becomes a unified multiturn structure of rigid and uniform proportion.

FIG. 5 illustrates the versatility in providing printed or etched circuit coils of complex configurations in a manner no more difficult to achieve than providing coils of more simple shape. Two coils 140 and 142 on a first side of board 141 there shown are oppositely aligned with a continuous coil pair on the opposite board side, the arrangement permitting the external connections to be made to the combined coil structure from only one side, rather than from both sides or from an edge.

The entire combined coil structure that is developed is a double differential pair. This may be seen by observing that coil 140 is rectangular in shape with its ends 144 and 145 terminating in a center location opposite its continuous elongate side. Coil 142 is a mirror image of coil 140 in position on the board so that its ends 151 and 152 are back-to-back with ends 145 and 144, respectively, of coil 140. On the opposite surface of the board, a coil structure is shown starting with an end 146 which is oppositely aligned from end 144 of coil 140. First, a coil 148 leading from end 146 is described, initially passing under coil end 145, which is similar in area to coil 140. After coil 148 is completely described, the end thereof continuously blends in Z-like fashion to describe an oppositely wound coil 149, coil 149 being diametrically opposite and similar to coil 142, eventually terminating in end 150 disposed opposite end 151. End 151 is that end of coil 149 which is diagonally opposite end 144 of coil 140 on the first surface of board 141.

The coils on the opposite surfaces of board 141 are then connected by through-hole plating connection or otherwise through the board, end 144 of coil 140 being connected with end 146 of coil 148 by connector 153 and end 151 of coil 142 being connected with end 150 of coil 149 by connector 155. The output may then be taken from this complex coil structure by leads 157 and 159 connected respectively to the ends of coils 142 and 140 that are not connected to coils 148 and 149, namely ends 152 and 145, respectively.

Printed circuit, multi-turn coils may be made in a manner illustrated in FIGS. 6, 7 and 8. In FIG. 6, a printed circuit board 110 is divided into five sections, and on each section a printed circuit coil is outlined. In the first section, coil 112 of a controlled, fixed dimension has output connections extending from the coil loop on the left end extending to front edge 114 of the board, these ends being designated 115 and 116. In the second section of board 110 a coil 118 is outlined which has the precise dimensions of coil 112 in the first section, except that ends 119 and 120 thereof communicating with edge 114 are located in such a manner that first end 119 corresponds in position to second end 116 of coil 112, and second end 120 of coil 118 is located toward the middle of coil 118. Similarly, coils 122, 123 and 124 are outlined on the third, fourth and fifth sections of board 110. In each case, the ends leading from the coil which communicate with edge 114 are progressively positioned so that the first end of each coil is positionally oriented to be in the same position as the second end of the previous coil.

The sections of board 110 are then cut along the section separation lines, indicated by the dotted lines in FIG. 6, and positioned in a stack orientation, such as shown in FIG. 7, the coils reading from top to bottom being coils 112, 118, 122, 123 and 124. Since end 116 is directly above end 119 when the coils are concentrically aligned, a connector 130 may be conveniently made such as by soldering between the edges of the boards, as shown. Similarly, coil 118 may be connected to coil 122, coil 122 may be connected to coil 123, and coil 123 may be connected to coil 124, thereby making a stacked five-turn, multi-coil continuous structure.

FIG. 8 shows an improvement in making the edge connections described above by terminating the ends of the coils at their respective board edges with a convenient conductive, receiving recess. Top board 130 shows a coil terminating with an end 131 and an end 133, each of which has a conductive recess in contact with the coil etched on the surface of the board. Similarly, the coil on board 135 terminates in ends 137 and 139 having conductive recesses. As described above, when board 130 is located over board 135 with the coils etched thereon in concentric alignment, second end 133 of the coil on board 130 is located vertically over first end 137 of the coil located on board 135. It is then convenient to place a connector 140 within recess end 133 and in recess end 137, thereby providing a greater area of contact for solder to be applied. Also, the recesses may be made sufficiently deep to accommodate connector 140 after insertion so that the edges of the stacked board arrangement remain flush.

In FIGS. 9 and 10, a multi-turn coil structure is shown which is particularly suited for scanning the surface of a pipe member by relative helical movement and detecting flaws that are aligned in the most likely directions. First, referring to FIG. 9, a pipe 160 is shown which is longitudinally translatable in a direction 162 and simultaneously rotatable in a direction 164. Of course, such rotational and longitudinal combined movement results in a helical movement of pipe 160. The detector coils affixed to a board 166 are placed adjacent the surface of pipe 160, three pairs of coils located on one surface of the board being shown for illustrative purposes. On board 166 are located a first pair 168 and 170 having identical dimensions, 168 being located slightly circumferentially displaced from coil 170 and longitudinally ahead of coil 170 in the direction of translation.

Coils 168 and 170 each have one side parallel to the axis of pipe 160 and one side 172 which is generally parallel to the natural helical seam or other defect that occurs in an area 173 in pipe produced by a hot-rolling process. Hence, the coils are triangularly shaped in a special manner more fully discussed below. To align with the helical seam, it may be seen that the most pointed junction connection of each of the coils points in the longitudinal direction of movement. It should also be noted that upon relative movement of pipe 160 with respect to board 166, coil side 172 moves with respect to area 173 generally in a direction 210 which is perpendicular to seam 173.

Now assuming that pipe 160 is circumferentially magnetized, longitudinal flaws in pipe 160 resulting in flux disturbances may be detected by the longitudinal sides of coils 168 and 170. Flows that occur in the hot-rolling process and aligned in the spiral seam direction cause flux disturbances which are peculiarly sensitively detectable by the sides of the respective coils that are aligned parallel to the spiral seam, such as side 172. When the pairs of coils are connected in series opposition, the advantages of such a connection are provided to eliminate changes in the flux patterns detected by both coils, while even small flaws are detectable that are aligned in either the horizontal or helical-seam directions and which cause disturbances in one coil or one series-aiding pair of coils at any instant of time which is different from the disturbances in the other coil or other series-aiding pair of coils.

Turning now to the particular form that the coils may take, FIG. 10 illustrates a coil 180 and a coil 182 located on one surface of the board there shown. Coil 180 is a multi-turn coil, having a plurality of turns following the triangular configuration of the coil and having an outer end 184 and an inner end 186. Coil 182 is similar in construction to coil 180 and terminates in end 188, corresponding to end 184 of coil 180, and inner end 190.

Located diametrically opposite coil 180 is coil 192 and wound series-aiding thereto, and located diametrically opposite coil 182 is coil 194 and wound series-aiding thereto. Coils 192 and 194 are joined together at their outer ends at connection 196. Coil 192 is connected at its inner end with coil 180 by a connector 198, and coil 194 is connected at its inner end with coil 182 by a connector 200. Coil 180 and coil 182 are wound as series-opposed and coil 192 and coil 194 are wound series-opposed, thereby making flaw disturbances under coils 180 and 192 differently sensitive from disturbances under coils 182 and 194.

A preferred structure of all the coils shown in FIG. 10 has etched lines that are .003 inch wide with spaces between the lines likewise .003 inch. The length of each coil is on the order of one inch and the typical angle between the longitudinal side and the seam-parallel side is 12 degrees, although for any particular pipe made in a particular mill this angle may vary greatly. It is possible to connect a plurality of coil pairs, such as the three pairs of coils shown in FIG. 9, in a convenient amplifier and logic circuit or in independent detecting circuits, as with coils of other configuration.

Now turning to FIGS. 11 and 12, convenient non-conductive boards having coils mounted thereon along with other components are shown. For instance, in FIG. 11 a coil pair 60 and 61 formed in a continuous manner on first side 63 of the board there shown has an edge aligned substantially parallel with the curved underedge 65 of the board, this edge being the one which contacts the pipe in scanning, such as shown for board 17 in FIG. 1. It will be noted because of the precision with which printed circuit boards are conventionally made that it is possible to precisely align the adjacent sides of coils 60 and 61 so that they are uniformly disposed with respect to edge 65. Diametrically opposite coils 60 and 61 and located on the opposite side 67 of the board are coils 69 and 71 similarly joined as with coils 60 and 61. The coil pairs on each side of the board are joined together through the board by connector 73 at their innermost ends. The entire coil structure forms a double differential coil structure, having the respective four sides of the coils precisely maintained with respect to scanning edge 65.

Mounted on the same board as the coil structures, and for convenience on only side 63 (although components could be mounted on both sides) are located components 73, 75, 76 and 77, which may form the related components in a typical detection circuit in which coils 60, 61, 69 and 71 are included. Printed circuit leads from the components may be brought together to provide a socket connection 79 for a transistor or a vacuum tube amplifier, the appropriate power connections 81 being available at edge 89 of the board opposite edge 65, as well as appropriate output connection 83. Of course, the board shown in FIG. 11 is purely exemplary, the components being mounted thereon being to show what could be mounted with the coils. Also, it should be recognized that integrated circuit components could be employed as well as the resistor, capacitor and inductor components that are shown.

In FIG. 12 a plurality of coils, this time being shown as single coil pairs rather than as double differential coil pairs as in FIG. 11, are mounted on the board there illustrated. On one side of the board are coils 90, 91 and 92, and respectively opposite each of the coils are coils 93, 94 and 95, appropriately interconnected through the board by connectors 96, 97 and 98, respectively. Again, as with the coils in FIG. 11, the edges nearest the scanning edge of the board may be maintained with precision, as is readily achievable with the etching of printed circuit leads on boards of this type. In the structure shown in FIG. 12 the three coil pairs scan different surfaces of the pipe, thereby producing three separate signals, depending upon the flux disturbance in the pipe being scanned underneath each of the coil pairs at a given instant of time.

Typically, each of the three outputs is brought out to amplifiers 100, 101 and 102, respectively. These outputs are in turn connected by printed circuit connections to an appropriate mixer or logic circuit 103, thereby providing an appropriate single output indication that is a resultant of the three separate outputs applied to 103. It may be that a single output is selected, perhaps the strongest of the three individual signals that are initially developed. Again, appropriate power connections 105 and output connections 107 may be provided to the components on the board.

While several embodiments of the invention have been described, it is obvious that various substitutions or modifications of structure may be made without varying from the scope of the invention.

What is claimed is:

1. Apparatus for detecting flaws in a longitudinally extending member having a circularly shaped surface, said member and the detecting apparatus being helically translatable relative to each other, said member having established therein a magnetic flux field that extends in a circumferential direction within said member, whereby magnetic flux lines of said field extend transversely to expected flaws in the member that extend both longitudinally and in a general helical direction, said apparatus including an improved magnetic flux detecting coil arrangement comprising, a sheet of nonconductive backing material, a printed circuit flux detecting coil disposed on one surface of said backing material, said coil having a triangular shape with first and second sides meeting at an included angle, means for supporting said backing material with the triangular shaped coil thereon in close proximity to said surface of the member, whereby said coil will intercept leakage magnetic flux from said member when the apparatus and the member are moved helically relative to each other, said coil being disposed with said first side extending longitudinally with respect to said member and with said second side generally parallel to the direction of said general helical direction in which flows are expected to extend, said general helical direction in which flaws are expected being transverse to the direction of said helical translation when considered with respect to the member, whereby said first side of the coil intercepts leakage flux associated with longitudinally extending flaw and said second side of the coil intercepts leakage flux associated with a flaw extending in said general helical direction.

2. The detecting coil arrangement claimed in claim 1 and further including, a second triangular shaped printed circuit flux detecting coil disposed on the opposite surface of said backing material, and means for electrically connecting said two coils on opposite sides of said backing material to provide a desired circuit connection therebetween.

3. The detecting coil arrangement claimed in claim 2 wherein said two triangular shaped coils on opposite sides of the backing material are disposed in substantial registration and are connected in series-aiding relationship.

4. The detecting coil arrangement claimed in claim 1 and further including, at least one additional triangular shaped printed circuit coil disposed on said one surface of the backing material in close proximity to the first-named coil and arranged with its two sides and included angle disposed similarly to those of the first-named coil, said two coils being disposed along a longitudinally extending direction relative to the member.

5. The detecting coil arrangement of claim 4 wherein, said two coils are electrically connected in series-opposed relationship.

References Cited

UNITED STATES PATENTS

| | | | |
|---|---|---|---|
| 2,014,524 | 9/1935 | Franz | 336—200 |
| 2,474,988 | 7/1949 | Sargrove. | |
| 2,666,254 | 1/1954 | Eisler | 336—200 |
| 2,874,360 | 2/1959 | Eisler | 336—200 |
| 3,002,260 | 10/1961 | Shortt et al. | 336—200 |
| 3,185,947 | 5/1965 | Freymodsson | 336—200 |
| 3,281,667 | 10/1966 | Dobbins et al. | 324—40 |

FOREIGN PATENTS

| | | |
|---|---|---|
| 950,696 | 2/1964 | Great Britain. |
| 993,265 | 5/1965 | Great Britain. |

WILLIAM F. LINDQUIST, Primary Examiner

R. J. CORCORAN, Assistant Examiner

U.S. Cl. X.R.

317—101; 336—200, 225